March 8, 1960  J. F. WOOD  2,928,052
TRANSDUCER POWER SUPPLY FOR OSCILLATORS
Filed Aug. 31, 1955  2 Sheets-Sheet 1

Inventor
John F. Wood
By Alois W. Graf
Attorney

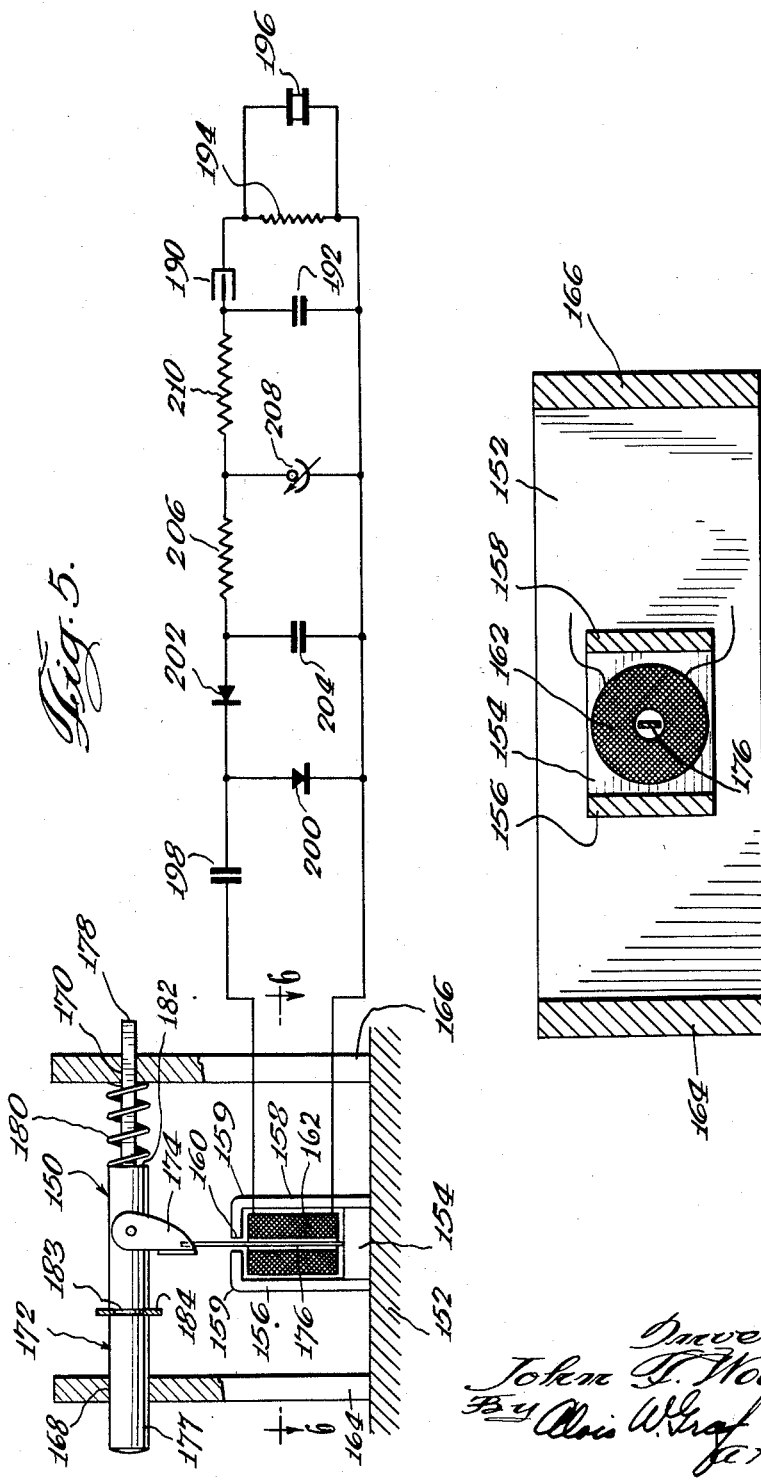

2,928,052
Patented Mar. 8, 1960

2,928,052

TRANSDUCER POWER SUPPLY FOR OSCILLATORS

John F. Wood, Buchanan, Mich., assignor to Electro-Voice, Incorporated, Buchanan, Mich.

Application August 31, 1955, Serial No. 531,678

10 Claims. (Cl. 331—185)

The present application relates to power sources, particularly to power sources for high impedance loads.

Devices have been developed in recent years which require relatively small amounts of power to operate them. On such device is the transistor. Transistors operate on relatively low voltages and small current drains. For this reason, many transistor devices have been constructed which employ dry cell batteries to operate them. The battery life in such devices is essentially the same as the shelf life for the batteries, however, batteries do have limited shelf lives, and hence, it is necessary to periodically replace the batteries used in such devices. Batteries also add considerably to the weight of the equipment, and also are relatively expensive. They are not sufficiently reliable over long periods of use. It is therefore one of the objects of the present invention to provide a power source which uses mechanical energy and does not require batteries.

The transistor has found application in signaling devices which are intended to be remotely operated for both civilian and military applications. Some of the chief advantages of transistors in remote signaling devices are light weight and small power requirements. It is one of the objects of the present invention to provide a power source operating totally upon mechanical energy which is especially adapted for a signaling device employing transistors.

Another application for a high impedance power source is in radiation measuring devices, particularly portable radiation measuring devices. Ionization chambers and counters require very little current for operation, but do require substantial voltage. It is also very desirable that a radiation measuring device be capable of portable operation, since portable operation may be required to determine radioactive contamination, as well as to prospect for uranium ore and other radioactive substances. It is therefore a further object of the present invention to provide a mechanically actuated power source particularly suitable for use with radiation measuring devices.

These and other objects of the present invention will be more fully understood when viewed in the light of the drawings, in which:

Figure 5 illustrates still another embodiment of the invention, a radiation measuring device being shown schematically and a portion of the power source being shown in section; and Figure 6 is a sectional view taken along the line 6—6 of Figure 5.

Figure 1:
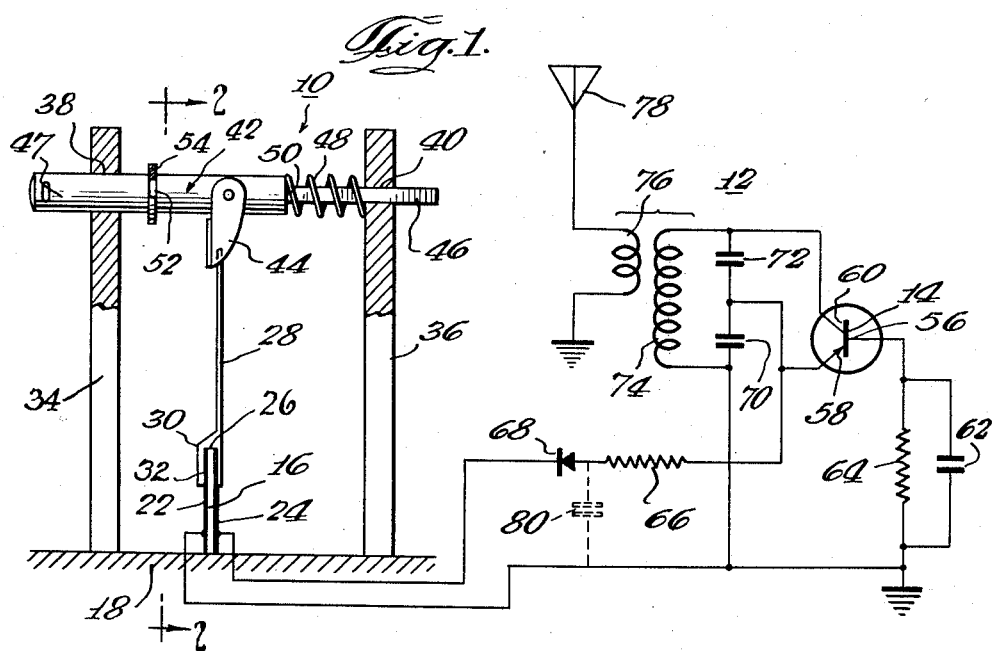
Figure 1 illustrates a signaling device having a power source constructed according to the teachings of the present invention.
Figures 2, 3, 4:
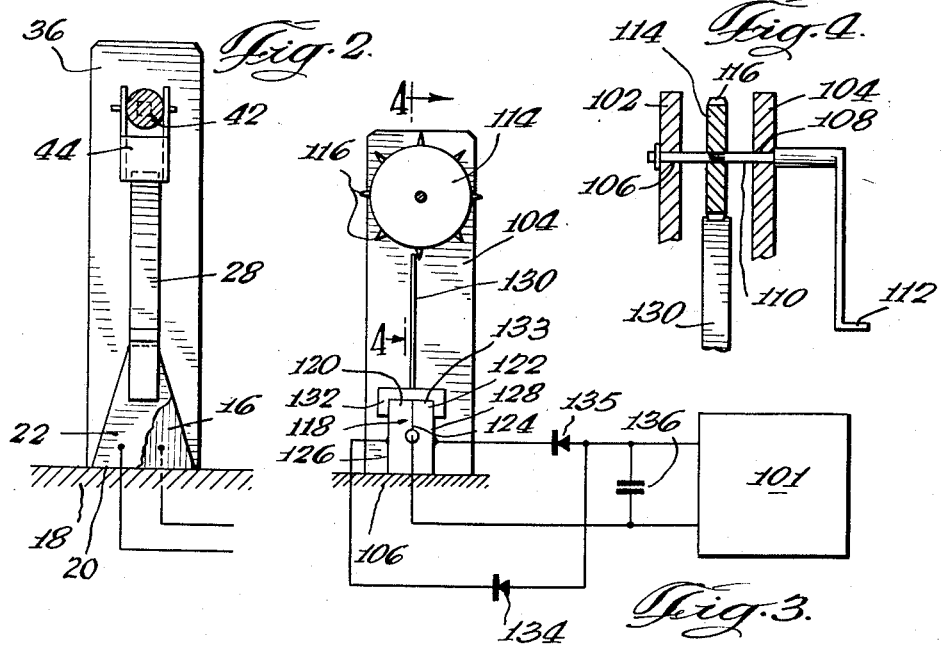
Figure 2 is a sectional view taken along the line 2—2 of the power source illustrated in Figure 1.
Figure 3 is an elevational view of another embodiment of the present invention illustrating a signaling device having a power source with a full wave rectifier.
Figure 4 is a sectional view along the line 4—4 of Figure 3.

The signaling device illustrated in Figures 1 and 2 has a power source 10 connected to an oscillator 12 which utilizes a transistor 14.

The power source 10 utilizes a piezoelectric crystal 16 which is mounted to a support member 18 and extends with its axis normally disposed therefrom. The crystal 16 is a "bender" type crystal cut in the form of a truncated plate, and the base 20 of the plate is rigidly secured to the support member 18. The parallel confronting surfaces of the plate shaped crystal 16 are provided with coatings 22 and 24 of electrically conducting material, such as silver in the particular construction described herein. The crystal may be any piezoelectric material, such as Rochelle salt or barium titanate.

The surface of the crystal 16 opposite to the base, designated 26, is secured to an arm 28. The arm 28 extends outwardly from the crystal 16 and it is totally supported by the crystal 16. The arm 28 is constructed of resilient material, such as spring steel, or other materials suitable for vibrating reeds. A mounting member 30 which is provided with an indentation 32 is disposed between an arm 28 and crystal 16 with the crystal 16 securely positioned within the indentation 32 of the mounting member 30. The arm 28 is attached to the exterior surface of the mounting member 30, and the mounting member 30 is constructed of electrically insulated material when the arm 28 is constructed of electrically conducting material.

A pair of parallel confronting plates 34 and 36 extend outwardly from the support member 18 on opposite sides of the crystal 16 and parallel with the surfaces thereof. The plates 34 and 36 are provided with confronting apertures 38 and 40, and a pin 42 is translatably disposed within the apertures 38 and 40. The pin 42 is disposed normal to the confronting surfaces of the crystal 16 and confronts the free end of the arm 28. A tooth, or catch 44, is secured to the pin 42 between the confronting plates 36 and 38, and the catch 44 extends outwardly from the pin 42 in the direction of the crystal 16 a sufficient distance to contact the free end of the arm 28 when translated toward it. The pin 42 also has a restricted portion 46 extending from adjacent to the catch through the plate 36, the remainder of the pin 42 being an expanded portion 47. The restricted portion 46 has a rectangular cross section, and the aperture 40 in the plate 36 is also rectangular, thereby keying the pin 42 against rotation. A helical spring 48 surrounds the restricted portion 46 of the pin and has one end abutting the plate 38 and the other end abutting a shoulder 50 on the pin between the restricted portion 46 and the expanded portion 47 of the pin 42. The pin 42 is also provided with a groove 52 in the expanded portion 47 between the catch 44 and the plate 34, and a C washer is secured within the groove 52 to provide a stop against the plate 34.

The transistor 14 is a point or junction type transistor using a base 56, emitter 58, and collector 60. The base 56 is connected to one of the electrically conducting coatings 22 on the crystal 16 through a condenser 62 and resistor 64 connected in parallel. The emitter 58 of the transistor 14 is connected to the other coating 24 on the crystal 16 through a resistor 66 and a rectifying diode 68 connected to pass current from the crystal 16 to the emitter 58. The emitter 58 is also connected to the junction between a pair of condensers 70 and 72, the condensers being connected to the ends of a tank coil 74. One end of the coil 74 is also connected to the coating 22 on the crystal 16, which form a ground terminal, and the other end of the coil 74 is connected directly to the collector 60 of the transistor 14. A second coil 76 is coupled to the first coil 74, and one end of the coil 76 is connected to the ground terminal and the other end to a radiating means 78.

In order to place the signaling device into operation, it is only necessary to press the end of the pin 42 which extends through the plate 34 toward the plate, thus translating the pin 42 and the catch 44 to abut the arm 28 and set the arm 28 into vibration. The vibration of the arm 28 causes the crystal 16 to generate voltages which appear as alternating charges upon the coatings 22 and 24. These charges are conducted to the oscillator 12 through the rectifying diode 68, thus energizing the oscillator 12 and producing a signal with a resonant frequency of the tank circuit of the oscillator 12, which consists of the coil 74 and the condensers 70 and 72. The signal produced is in the form of a series of pulses with a repetition rate equal to the vibration frequency of the crystal 16. In this manner, the transmitter 12 produces a signal which is amplitude modulated at the frequency of the arm 28.

The fact that the signal produced by the oscillator 12 is amplitude modulated makes it possible to operate a sensitive circuit by means of filters tuned to the modulation frequency of the signal, and thus key the oscillator 12 to the sensitive circuit. Also a plurality of transducers 10 may be connected in series and used to energize the oscillator 12, thus amplitude modulating the oscillator with a plurality of frequencies. A receiving circuit may then be keyed to each of these frequencies.

The transmitter 12 also will produce an unmodulated carrier if a condenser 80, illustrated in dotted lines in Figure 1, is connected between the junction of the resistor 66 and the rectifying diode 68 and the ground terminal of the oscillator 12. The voltage pulses appearing across the output of the diode 68 are then stored by the condenser 80, thus supplying a constant direct current to the oscillator 12.

The oscillator 12 will continue to produce a signal until the amplitude of the vibrations of the arm 28 falls sufficiently to reduce the voltage developed by the crystal 16 to a value insufficient to excite the oscillator 12. The operator must then again depress the pin 42 into the plate 34, and upon releasing the pin, the spring 48 will again drive the catch 44 across the end of the arm 28, and renew its vibrating energy. The maximum voltage output of this power supply is limited principally by the breaking strength of the crystal 16.

Figures 3 and 4 illustrate a full wave rectified power supply in combination with an oscillator 101, which may be identical with the oscillator 12 shown in Figure 1. In this device, a pair of parallel plates 102 and 104 are attached normal to a plate shaped support member 106. The plates 102 and 104 are provided with apertures 106 and 108, and an axle 110 is rotatably journaled within the apertures 106 and 108. A crank handle 112 is attached to the end of the axle 110, adjacent to the plate 104. A wheel 114 is secured to the axle 110 centrally between the plates 102 and 104. The wheel 114 is provided with a plurality of spaced protruding teeth 116.

An electromechanical transducer 118 is mounted to the support member 106 confronting the wheel 114. This transducer 118 has a pair of piezoelectric crystals 120 and 122 which are mounted together to form a bender type crystal. Each of the crystals 120 and 122 are plate shaped, and one of the surfaces of each crystal is bound together by a common electrically conducting coating 124, thus forming a crystal which bends rather than twists. The other surface of crystal 120 is provided with an electrically conducting coating 126, and the other surface of the crystal 122 is also provided with an electrically conducting coating 128. An arm 130 is attached to the end of the crystals 120 and 122 opposite to the support member 102 by a mounting member 132. The mounting member 132 is provided with an indentation 133 into which the electromechanical transducer 118 is disposed and secured, and the arm 130 is attached to the mounting member 132 to be disposed parallel to the surface of the crystals 120 and 122. The arm 130 is constructed of resilient material, such as spring steel, and the mounting member 132 is constructed of electrically insulating material, such as plastic. The arm 130 extends away from the electromechanical transducer 118 and confronts the wheel 114, so that the teeth 116 thereof will abut the arm 130 when the wheel is rotated by the crank 112.

The electrically conducting coating 126 of the crystal 120 is electrically connected to a rectifying diode 134, and the electrically conducting coating 128 of the crystal 122 is electrically connected to a rectifying diode 135. The output sides of the diodes 134 and 135 are interconnected. The coating 124 common to both crystals 120 and 122 is connected to the ground terminal of the oscillator 101, and a condenser 136 is connected between this terminal and the interconnected terminals of the diodes 134 and 135.

Since the surfaces 126 and 128 of the crystals 120 and 122 develop potentials of opposite sign when the crystals are bent to either direction, an alternating current is developed equal in voltage amplitude to the sum of the voltage developed by each crystal. The alternating current generated by the crystals 120 and 122 is conducted through the diode rectifiers 134 and 135 to produce a direct current charge on condenser 136.

In order to excite the oscillator 12, the crank handle 112 is rotated, causing the teeth of the wheel 114 to contact the arm 130 and set it into vibratory motion. Since the amplitude and the vibrations of the arm 130 are restored each time the arm 130 is released by one of the teeth 116 of the wheel 114, the direct current voltage supplied to the oscillator 12 remains substantially constant. The principal effect of the condenser 136 is to provide a storage of charge to compensate for the dropping off of the voltage generation of the electromechanical transducer 118 during the portion of the cycle in which the arm 130 is in actual contact with one of the teeth 116 of the wheel 114, since during this period of time very little voltage generation will occur. The condenser 136 also eliminates hum.

Figures 5 and 6 illustrate another embodiment of the present invention which utilizes an electromagnetic power source in combination with a radiation measuring device. The power source, designated 150, utilizes a support plate 152 upon which a bar magnet 154 is mounted. The magnet 154 is provided with pole pieces 156 and 158 which extend away from the support plate 152 through the ends of the magnet 154 and are then provided with bends 159 toward each other, thus forming a gap 160. A coil 162 consisting of a plurality of layers of turns is disposed between the pole pieces 156 and 158 and rests upon the magnet 154.

A pair of support members 164 and 166 extend outwardly from the support plate 152 and are provided with confronting apertures 168 and 170. A pin 172 is translatably disposed within the apertures 168 and 170, and the pin 172 is provided with a protruding catch 174 centrally thereof. A resilient arm 176 constructed of material having high magnetic permeability is secured at one end to the center of the bar magnet 154, and the arm 176 extends through the gap 160 to confront the pin 172. The catch 174 is adapted to abut the arm 176. The arm 176 is constructed of material of high resilience and permeability, so that the arm 176 is placed in vibration when the catch 174 displaces and releases the arm from its position of rest.

The pin 172 has an enlarged portion 177 and a restricted portion 178 which is rectangular in shape, the aperture 170 through which the restricted portion 178 is slightly disposed also being rectangular in shape and restricting rotation of the pin 172. A helical spring 180 is disposed about the restricted portion 178 of the pin 172 and abuts against the support plate 166 and a shoulder 182 between the restricted portion 178 and enlarged portion 176 of the pin 172. The pin 172 is also provided with a groove 183 between the catch 174 and the plate 164 and a C type washer 184 is secured within the groove 183 to provide a stop for the pin 172 against the plate 164.

When the enlarged portion 177 of the pin 172 is pushed toward the plate 164 the catch 174 will engage the arm 176 and then release the arm 176 placing it in vibratory resonance. As a result an alternating magnetic flux will flow in a path following the arm 176, the pole pieces 156 and 158 and the magnet 154. In this manner, the alternating magnetic flux induces a voltage in the coil 162 which is alternating in form.

The radiation measuring device utilizes a counting chamber 190 connected in a series circuit consisting of the chamber 190, a condenser 192 and a resistor 194. A crystal type head set 196 is connected in parallel with the resistor 194 to give an audible indication of a voltage pulse developed across the resistor 194. The junction of resistor 194 and condenser 192 is directly connected to one end of the coil 162 of the power source 150 and the other end of the coil 162 is also connected to this junction through a condenser 198 and a rectifying diode 200. The junction between the condenser 198 and rectifying diode 200 is also connected to the junction of condenser 192 and resistor 194 through a diode 202 and a condenser 204 and the junction between the diode 202 and condenser 204 is again connected to the junction of condenser 192 and resistor 194 through a resistor 206 and gaseous voltage regulating tube 208. The junction between resistor 206 and the voltage regulating tube 208 is connected to the junction between the ionization chamber 190 and the condenser 192 through a resistor 210.

The alternating voltage developed by the power source 150 is rectified and multiplied by condenser 198, diode 200, diode 202 and condenser 204, since these elements are connected in a conventional circuit for these purposes. It is to be understood that the voltage multiplier circuit is not absolutely necessary and may be eliminated if the coil 162 has sufficient turns to generate a high enough potential. The use of a voltage multiplier circuit, however, permits a smaller coil 162, and hence a more efficient magnetic circuit. The voltage multiplier could of course employ more than two diodes in a conventional circuit, thus permitting use of an even smaller coil 162.

The voltage developed across condenser 204 is approximately twice that developed across the coil 162, and this voltage is applied to the counting chamber 190 through the voltage regulating circuit consisting of resistors 206 and 210, and voltage regulator tube 208, thereby placing a potential on the chamber 190 within the proper range. When radiation impinges upon the counter chamber 190, it causes current to flow through the counter circuit consisting of the counter 190, condenser 192 and resistor 184. This develops a voltage across resistor 194 which is audible in the form of a pulse in the crystal head set 196.

In all of the embodiments of the invention herein disclosed, an electromechanical transducer is used to develop electrical energy from mechanical energy. The mechanical energy required is vibratory in each case, and the transducer responds to this mechanical energy when the vibration occurs in at least one plane, referred to as the "responsive plane" of the transducer.

The man skilled in the art will readily devise many modifications of the present invention and many uses for the present invention in addition to those described. For example, it is obvious that the piezoelectric power source, illustrated in Figures 1 and 2, or in Figures 3 and 4, could be substituted for the electromagnetic embodiment of the invention illustrated in Figures 5 and 6, and vice versa. Further, it is obvious, that the toothed wheel illustrated in Figures 3 and 4 could be employed in the power source shown in Figures 1 and 2 or the electromagnetic power source illustrated in Figures 5 and 6. Further, the piezoelectric power source of Figures 1 and 2 and Figures 3 and 4 utilize crystals which generate a voltage by bending, while it is obvious that crystals generating potentials by twisting could be employed. For these reasons, it is intended that the scope of the present invention be not limited to the foregoing disclosure, but rather only by the appended claims.

The invention claimed is:

1. A power source comprising an electromechanical transducer responding to vibratory motion in at least one plane, a flexible arm secured to the transducer, and means to set the arm into vibrating motion comprising a support means secured to the transducer, and a pin reciprocally mounted to the support means generally parallel to the responsive plane of the transducer, said pin having a tooth extending outwardly therefrom confronting the arm, whereby reciprocation of the pin causes the tooth to contact the arm, bend the arm, and release the arm, thus setting the arm into vibratory motion.

2. A power source comprising an electromechanical transducer responding to vibratory motion in at least one plane, a flexible arm secured to the transducer, and means to set the arm into vibratory motion comprising a support means secured to the transducer including a pair of parallel plates having confronting apertures therein, said apertures being disposed on an axis generally parallel to the responsive plane of the transducer, and a pin reciprocally disposed within the apertures in the plates, said pin having an outwardly extending tooth confronting the arm, whereby reciprocation of the pin causes the tooth to contact the arm, bend the arm, and release the arm, thus setting the arm into vibratory motion.

3. A power source comprising an electromechanical transducer responding to vibratory motion in at least one plane, a flexible arm secured to the transducer, and means to set the arm into vibratory motion comprising a support means secured to the transducer including a pair of parallel plates having confronting apertures therein, said apertures being on an axis generally parallel to the responsive plane of the transducer, a pin reciprocally disposed within the apertures in the plates, said pin having an outwardly extending tooth confronting the arm and a protruding stop between the tooth and the first of said plates adapted to abut said plate, and a helical spring disposed about the pin, the end of said spring adjacent to the tooth being secured to the pin between the tooth and the second of said plates and the other end of said spring abutting the second of said plates, whereby reciprocation of the pin causes the tooth to contact the arm, bend the arm, and release the arm, thus setting the arm into vibratory motion.

4. A power source comprising an electromechanical transducer responding to vibratory motion in at least one plane, a flexible arm secured to the transducer, and means to set the arm into vibratory motion comprising a support means secured to the transducer having a pair of parallel plates provided with confronting apertures therein, the aperture in the first of said plates being larger than the aperture in the second of said plates and said apertures being on an axis generally parallel to the responsive plane of the transducer, a pin provided with a larger portion, a smaller portion and a shoulder therebetween reciprocally disposed within the apertures in the plates, the larger portion being snugly disposed within the larger aperture and the smaller portion being snugly disposed within the smaller aperture, said pin having an outwardly extending tooth confronting the arm and a transverse groove disposed between the tooth and the first plate, a C-type washer disposed within said groove adapted to form a stop against the first plate, and a helical spring disposed about the smaller portion of the pin, one end of said pin abutting the shoulder of the pin and the other end abutting the second of said plates, whereby reciprocation of the pin causes the tooth to contact the arm, bend the arm, and release the arm, thus setting the arm into vibratory motion.

5. A power source for a high impedance load comprising the elements of claim 4 wherein the electromechanical transducer comprises a piezoelectric crystal mounted at one end generally normal to the pin and having electrically conducting coatings on confronting surfaces, the arm being secured to the other end of the crystal.

6. A power source for a high impedance load comprising the elements of claim 1 wherein the electromechanical transducer comprises a piezoelectric crystal mounted at one end generally normal to the moveable member and having electrically conducting coatings on confronting surfaces, the arm being secured to the other end of the crystal.

7. A power source comprising the elements of claim 1 wherein the electromechanical transducer comprises a support member, a magnet mounted to the support member, a pair of pole pieces attached to the magnet at one end and forming a gap at the other end, the flexible arm being constructed of magnetically permeable material and mounted to the magnet at one end, said arm extending through the gap adjacent to its other end, and a coil disposed about the arm.

8. A power source comprising the elements of claim 3 wherein the electromechanical transducer comprises a magnet mounted to the support member, a pair of pole pieces attached to the magnet at one end forming a gap at the other end, the flexible arm being constructed of magnetically permeable material and mounted to the magnet at one end, said arm extending through the gap adjacent to its other end, and a coil disposed about the arm.

9. A power source comprising the elements of claim 1 wherein the electromechanical transducer comprises a first plate shaped piezoelectric crystal having electrically conductive coatings on confronting faces, a second plate shaped piezoelectric crystal having electrically conducting coatings on confronting faces, means to secure two of said faces together to form a common terminal, said crystals being mounted to the support means at one end and the flexible arm being secured to the other end of said crystals.

10. A signaling device comprising an oscillator having a transistor, a resonant tank circuit electrically connected to the transistor, and a power source electrically connected to the transistor characterized by the construction wherein the power source comprises an electromechanical transducer responding to vibratory motion in at least one plane, a flexible arm secured to the transducer, means to set the arm into vibratory motion comprising a support means secured to the transducer including a pair of parallel plates having confronting apertures therein disposed on an axis generally parallel to the responsive plane of the transducer, and a pin reciprocally disposed within the apertures of the plates, said pin having an outwardly extending tooth confronting the arm, and a rectifier connected between the electromechanical transducer and the transistor.

References Cited in the file of this patent

UNITED STATES PATENTS

| | | |
|---|---|---|
| 2,185,966 | Pfanstiehl | Jan. 2, 1940 |
| 2,249,305 | Ando | July 15, 1941 |
| 2,300,638 | Wente | Nov. 3, 1942 |
| 2,309,703 | Lovell et al. | Feb. 2, 1943 |
| 2,364,681 | Wright | Dec. 12, 1944 |
| 2,523,769 | Maloney et al. | Sept. 26, 1950 |
| 2,547,027 | Winkler | Apr. 3, 1951 |
| 2,558,991 | Stanton | July 3, 1951 |
| 2,628,338 | Gould | Feb. 10, 1953 |
| 2,676,273 | Oestreicher | Apr. 20, 1954 |
| 2,851,592 | Webster | Sept. 9, 1958 |